United States Patent
Suzuki (10) Patent No.: US 9,040,810 B2
(45) Date of Patent: May 26, 2015

(54) SOLAR CELL MODULE

(75) Inventor: Issei Suzuki, Chiyoda-ku (JP)

(73) Assignee: MITSUBISHI ELECTRIC CORPORATION, Chiyoda-Ku, Tokyo (JP)

(*) Notice: Subject to any disclaimer, the term of this patent is extended or adjusted under 35 U.S.C. 154(b) by 0 days.

(21) Appl. No.: 13/263,209

(22) PCT Filed: Apr. 21, 2009

(86) PCT No.: PCT/JP2009/057918
§ 371 (c)(1),
(2), (4) Date: Oct. 6, 2011

(87) PCT Pub. No.: WO2010/122638
PCT Pub. Date: Oct. 28, 2010

(65) Prior Publication Data
US 2012/0024354 A1   Feb. 2, 2012

(51) Int. Cl.
*H01L 31/042* (2014.01)
*F16F 1/376* (2006.01)
(Continued)

(52) U.S. Cl.
CPC ............... *F16F 1/376* (2013.01); *F16F 1/3737* (2013.01); *F16F 15/04* (2013.01); *F16F 15/073* (2013.01); *F16F 15/08* (2013.01); *F24J 2/4607* (2013.01); *F24J 2/4609* (2013.01); *F24J 2/5211* (2013.01); *Y02E 10/47* (2013.01); *Y02E 10/52* (2013.01); *H02S 20/00* (2013.01)

(58) Field of Classification Search
CPC ...... H01L 31/042; F24J 2/4607; F24J 2/4609; F24J 2/5211; F16F 15/04; F16F 1/376; F16F 1/3737; F16F 15/073; F16F 15/08; Y02E 10/52; Y02E 10/47

USPC ......................................................... 136/251
See application file for complete search history.

(56) References Cited

U.S. PATENT DOCUMENTS 2,727,407 A    12/1955  Richards et al.
4,167,644 A *  9/1979   Kurth et al. ................... 136/251
(Continued)

FOREIGN PATENT DOCUMENTS

CN       1712262 A    12/2005
GB       404895 A     1/1934
(Continued)

OTHER PUBLICATIONS

Extended European Search Report dated Sep. 24, 2012, issued in corresponding European Patent Application No. 12001836.1. (7 pages).
(Continued)

*Primary Examiner* — Tamir Ayad
(74) *Attorney, Agent, or Firm* — Buchanan Ingersoll & Rooney PC (57) ABSTRACT

The solar cell module includes a solar panel that includes a transparent substrate and is configured by aligning solar cells, a reinforcing frame arranged on the back surface of the solar panel, and a shock absorbing unit arranged between the solar panel and the reinforcing frame, where the shock absorbing unit has the first main surface facing the solar panel, which is a flat surface, and a second main surface facing the reinforcing frame, which is a curved surface bowed in the longitudinal direction of the reinforcing frame, having an arc shape in cross section, and convexed toward the reinforcing frame side.

3 Claims, 8 Drawing Sheets

(51) Int. Cl.
*F16F 1/373* (2006.01)
*F16F 15/04* (2006.01)
*F16F 15/073* (2006.01)
*F16F 15/08* (2006.01)
*F24J 2/46* (2006.01)
*F24J 2/52* (2006.01)

(56) References Cited

U.S. PATENT DOCUMENTS

| | | | | |
|---|---|---|---|---|
| 4,286,006 A | * | 8/1981 | Boelter | 428/182 |
| 4,505,974 A | | 3/1985 | Hosler | |
| 4,832,001 A | * | 5/1989 | Baer | 126/579 |
| 4,974,820 A | * | 12/1990 | Nakanishi | 267/152 |
| 5,217,540 A | | 6/1993 | Ogura | |
| 5,551,673 A | | 9/1996 | Furusawa et al. | |
| 6,106,654 A | | 8/2000 | Velin et al. | |
| 7,956,279 B2 | * | 6/2011 | Morita et al. | 136/251 |
| 2005/0161074 A1 | * | 7/2005 | Garvison et al. | 136/246 |
| 2006/0163440 A1 | | 7/2006 | Williams et al. | |
| 2006/0254193 A1 | * | 11/2006 | Platts | 52/713 |
| 2007/0290422 A1 | | 12/2007 | Akashi | |
| 2010/0132761 A1 | | 6/2010 | Echizenya et al. | |
| 2010/0132767 A1 | | 6/2010 | Miyamoto et al. | |

FOREIGN PATENT DOCUMENTS

| | | | | |
|---|---|---|---|---|
| GB | 2 340 060 A | | 2/2000 | |
| GB | 2415479 A | | 12/2005 | |
| JP | 57-005070 U | | 1/1982 | |
| JP | 08-177176 A | | 7/1996 | |
| JP | 09-148612 A | | 6/1997 | |
| JP | 10-294485 A | | 11/1998 | |
| JP | 2002-223911 A | | 8/2002 | |
| JP | 2003-105940 A | | 4/2003 | |
| JP | 2004-006625 A | | 1/2004 | |
| JP | 2004-146765 A | | 5/2004 | |
| WO | 98/48992 A1 | | 11/1998 | |
| WO | 2006/098473 A1 | | 9/2006 | |
| WO | WO2006/098473 | * | 9/2006 | H01L 31/048 |
| WO | WO 2008/136095 A1 | | 11/2008 | |
| WO | WO 2008/139609 A1 | | 11/2008 | |

OTHER PUBLICATIONS

Office Action (Communication pursuant to Rule 114(2) EPC) dated Jul. 19, 2012, issued in corresponding European Patent Application No. 12001836.1. (16 pages).
International Search Report (PCT/ISA/210) issued on Aug. 4, 2009, by Japanese Patent Office as the International Searching Authority for International Application No. PCT/JP2009/057918.
Written Opinion (PCT/ISA/237) issued on Aug. 4, 2009, by Japanese Patent Office as the International Searching Authority for International Application No. PCT/JP2009/057918.
Office Action dated Oct. 16, 2012, issued in corresponding Japanese Patent Application No. 2011-510115, and an English Translation thereof. (3 pages).
Office Action (Decision of a Patent Grant) dated Dec. 4, 2012, issued in corresponding Japanese Patent Application No. 2011-147487, and an English Translation thereof. (2 pages).
Office Action issued on Mar. 11, 2013 by the USPTO in corresponding U.S. Appl. No. 13/418,826.
Extended European Search Report issued on Apr. 12, 2013 by the EPO in corresponding European Patent Application No. 09 843 638.9.
Office Action issued on Dec. 23, 2013, by the Chinese Patent Office in corresponding Chinese Patent Application No. 201210070691.3 and an English translation of the Office Action. (7 pages).
First Office Action issued on Aug. 20, 2013, by the Chinese Patent Office in corresponding Chinese Patent Application No. 200980158892.5, and an English Translation of the Office Action. (9 pages).
Office Action issued on Sep. 12, 2013 by the USPTO in corresponding U.S. Appl. No. 13/418,826.
European Office Action dated Aug. 25, 2014, issued in corresponding European Patent Application No. 09843638.9 (5 pgs).
European Office Action dated Aug. 25, 2014, issued in corresponding European Patent Application No. 12001836.1 (6 pgs).
Office Action issued by the U.S. Patent and Trademark Office in the U.S. Appl. No. 13/418,826, mailed Oct. 3, 2014, U.S. Patent and Trademark Office, Alexandria, VA (9 pages).
Office Action issued by the U.S. Patent and Trademark Office in the U.S. Appl. No. 13/418,826, mailed Mar. 4, 2015, U.S. Patent and Trademark Office, Alexandria, VA (10 pages).

* cited by examiner

SOLAR CELL MODULE

FIELD

The present invention relates to a solar cell module that is installed in an architectural structure such as a house and a building to generate power by use of sunlight.

BACKGROUND

Some of solar cell modules have a structure that is obtained by placing a transparent substrate (glass) on the light receiving surface, aligning and arranging multiple solar cells connected in series or in parallel on the back surface of this transparent substrate, sealing these solar cells with a sealing resin to prepare a solar panel, and then fitting a frame onto the edge portion of the solar panel.

In general, a solar cell module is installed on an architectural structure such as a house and a building and is exposed to wind and weather. Because the solar cell module is a product that is used in such a sever environment, a strength against wind load and snow load provides a measure of product quality. Recently, solar cell modules have been upsized in order to reduce the cost per unit output and save time required for installation and wire connection. Because of this upsizing, the load bearing property has been lowered in the solar panel, especially in its transparent substrate.

A snow load of the snow or the like accumulated on the surface of the solar cell module acts perpendicularly downward, which bends the solar cell module down. As a countermeasure to this, it has been known that, in addition to the frame that surrounds the four sides of the solar panel, a reinforcing frame is provided to span across the frames on the back side of the solar panel and support the solar panel from the back side. With such a structure, it is expected that the amount of deformation of the transparent substrate can be reduced when a load is applied thereto.

Furthermore, in a solar cell module incorporating the reinforcing frame on the back surface of the panel, a shock absorbing member is further attached to the back surface of the panel to prevent the back sheet from wearing and the cells from breaking due to a collision or friction between the back surface of the panel and the reinforcing frame. With such a structure, the back surface of the module would not be in direct contact with the reinforcing frame, and therefore breakage and friction of the back surface of the module can be avoided (see Patent Literature 1, for example).

CITATION LIST

Patent Literature

Patent Literature 1: Japanese Patent Application Laid-open No. 2004-006625
Patent Literature 2: International Publication WO 2008/139609

SUMMARY

Technical Problem

However, because the shock absorbing member suggested by Patent Literature 1 is an elastic body, the reinforcing frame tends to sink into the shock absorbing member when a load on the module is increased, which would bring the module and the reinforcing frame into contact at a position where no shock absorbing member is provided. Thus, improvement has been demanded. Furthermore, there is fear that the shock absorbing member which is an elastic body may wear down due to repeated frictions with the reinforcing frame under a vibration load such as wind pressure, and thus improvement has been demanded.

To solve the above problems, a solar cell module suggested by Patent Literature 2 incorporates a shock absorbing member prepared with a hard material. However, when the shock absorbing member having a simple rectangular-solid-like structure formed of a hard material is inserted between the solar panel and the reinforcing frame that are substantially rigid bodies, stress tends to be locally concentrated in the edge portion of the shock absorbing member. The stress that is locally concentrated may cause the breakage of the solar panel, especially the layer formed of glass, and the load bearing performance of the module may also be lowered. Thus, improvement has been required.

The present invention has been conceived to solve the above problems. The purpose is to obtain a solar cell module that can improve the load bearing performance of the module that tends to be lowered, by mitigating concentration of the local stress created in the edge portion of the shock absorbing member and preventing the solar panel, especially the layer formed of glass (transparent substrate), from being broken.

Solution to Problem

In order to solve the aforementioned problems and attain the aforementioned object, a solar cell module according to the first aspect of the present invention is constructed in such a manner as to include: a solar panel that includes a transparent substrate and is configured by aligning solar cells; a reinforcing frame arranged on a back surface of the solar panel; and a shock absorbing unit arranged between the solar panel and the reinforcing frame, and wherein the shock absorbing unit has a first main surface facing the solar panel, which is a flat surface, and a second main surface facing the reinforcing frame, which is a curved surface curved in a longitudinal direction of the reinforcing frame, is convexed toward the reinforcing frame, and has an arc shape in cross section.

Furthermore, a solar cell module according to the second aspect of the present invention is constructed in such a manner as to include: a solar panel that includes a transparent substrate and is configured by aligning solar cells; a reinforcing frame arranged on a back surface of the solar panel; and a shock absorbing unit arranged between the solar panel and the reinforcing frame, and wherein the shock absorbing unit has a first main surface facing the solar panel, which is a flat surface, and a second main surface facing the reinforcing frame, which has a plurality of projections extending in a direction orthogonal to the reinforcing frame, in which a curved surface smoothly connecting ridge lines of the projections to one another serves as an arc-in-section curved surface convexed toward the reinforcing frame side.

The curved surface having an arc shape in cross section may be a curved surface of substantially an arc form in section, which includes, for example, a surface that contains smoothly continued flat surfaces partially in the curved surface.

Moreover, a solar cell module according to the third aspect of the present invention is constructed in such a manner as to include: a solar panel that includes a transparent substrate and is configured by aligning solar cells; a reinforcing frame arranged on a back surface of the solar panel; and a shock absorbing unit arranged between the solar panel and the reinforcing frame, and wherein the shock absorbing unit has a first main surface facing the solar panel, which is a flat surface, and a second main surface facing the reinforcing frame, and notches are provided at least in center of end portions of the second main surface in a longitudinal direction of the reinforcing frame.

Additionally, a solar cell module according to the fourth aspect of the present invention is constructed in such a manner as to include: a solar panel that includes a transparent substrate and is configured by aligning solar cells; a reinforcing frame arranged on a back surface of the solar panel; and a shock absorbing unit arranged between the solar panel and the reinforcing frame, and wherein the shock absorbing unit is formed into bellows that expand and contract in a longitudinal direction of the reinforcing frame and have resilience in a thickness direction.

Advantageous Effects of Invention

In the solar cell modules according to the present invention, each of the shock absorbing units has a characteristic shape so that local stress concentration that tends to appear between the solar panel and the shock absorbing unit can be mitigated. Then, the breakage of the solar panel, especially the layer formed of glass, can be avoided, and thus the load bearing performance of the module that tends to be lowered can be improved.

DESCRIPTION OF EMBODIMENTS

Exemplary embodiments of the solar cell modules according to the present invention are explained in detail below with reference to the drawings. The present invention is not limited to these embodiments, however.

Embodiment 1

Figure 1:
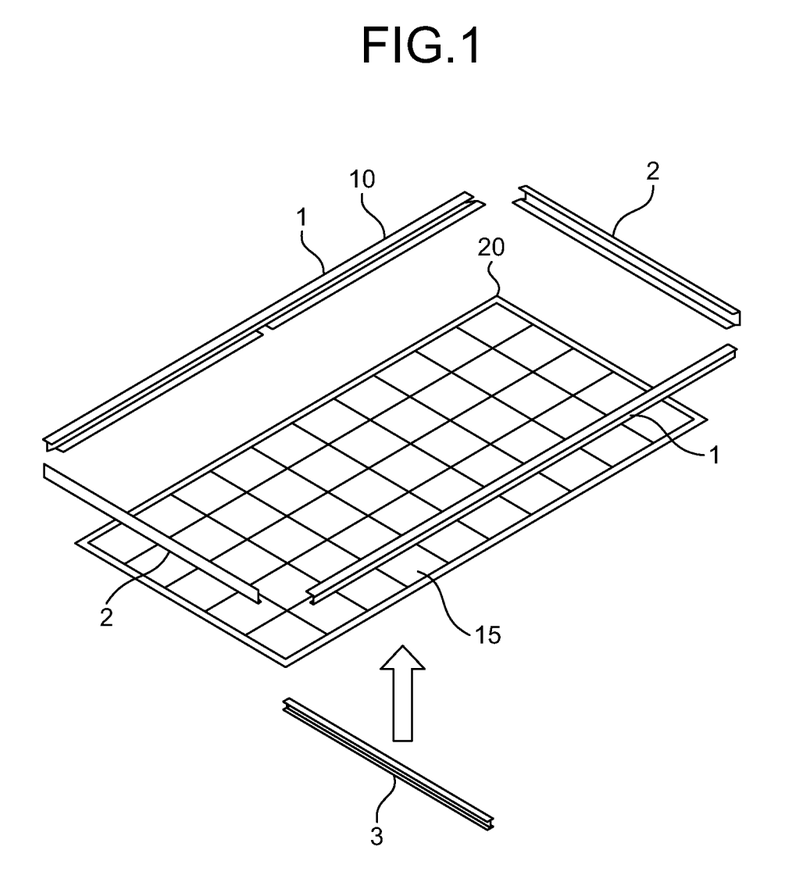
FIG. 1 is a perspective view of the solar cell module in the initial process of the assembly according to the present invention.
Figure 2:
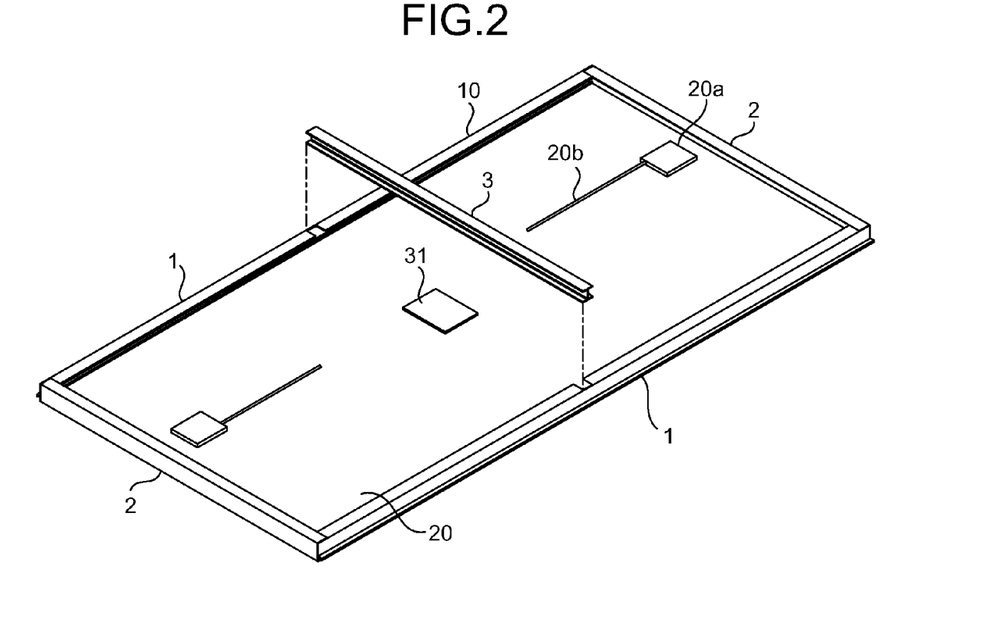
FIG. 2 is a perspective view for showing a reinforcing frame being attached to an intermediate assembly body to which a rectangular frame is attached to the outer edge of the solar cell panel, from its back side.
Figure 3:
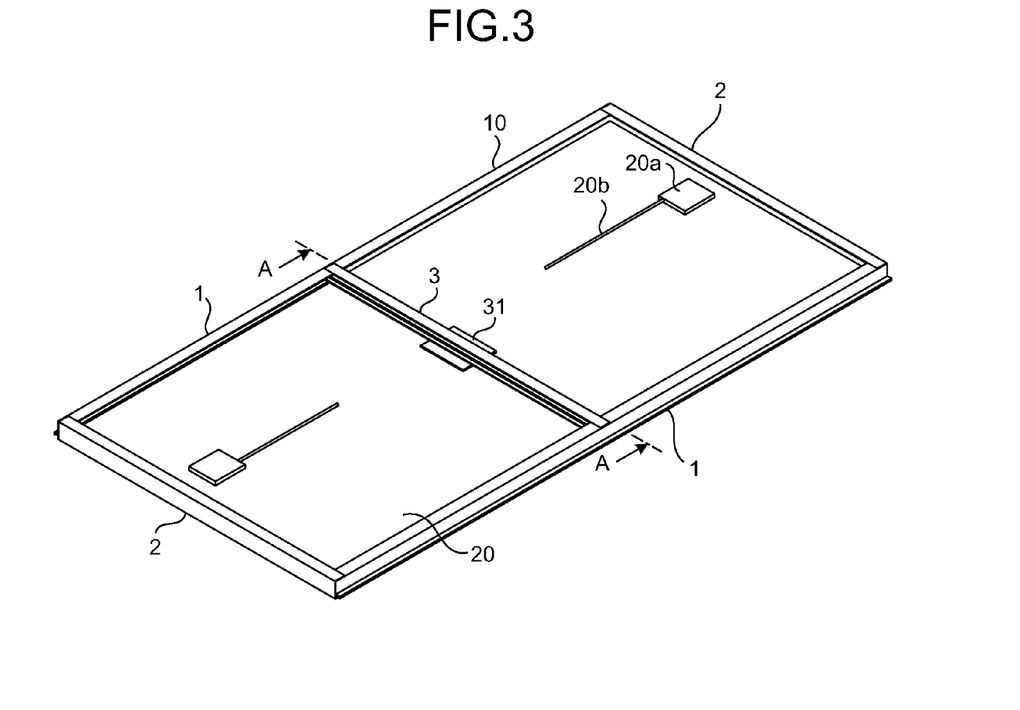
FIG. 3 is a perspective view for showing the completion of the operation of attaching the reinforcing frame to the intermediate assembly body.

FIG. 1 is a perspective view of the solar cell module according to the present invention in the initial process of the assembly. FIG. 2 is a perspective view for showing a reinforcing frame being attached to an intermediate assembly body in which a rectangular frame is attached to the outer edge of the solar cell panel, from the back side. FIG. 3 is a perspective view for showing the completion of the operation of attaching the reinforcing frame to the intermediate assembly body.

The solar cell module includes a solar panel 20 of a substantially rectangular flat plate, a shock absorbing member 31 adhered to the back surface of the solar panel 20, a rectangular frame 10 that is a rectangular frame surrounding the entire perimeter of the edge of the solar panel 20, and a reinforcing frame 3 attached to the rectangular frame 10. The shock absorbing member 31 is adhered at a position where it is sandwiched between the solar panel 20 and the reinforcing frame 3.

As illustrated in FIG. 1, the solar panel 20 is configured by multiple solar cells 15 that are aligned lengthwise and breadthwise to substantially form a rectangular plate. The rectangular frame 10 includes a pair of opposing long frames 1 and 1 and a pair of short frames 2 and 2 connected to the two ends of the long frames 1 and 1. The pair of long frames 1 and 1 and the pair of short frames 2 and 2 are connected to each other to form the rectangular frame 10.

As illustrated in FIG. 2, the shock absorbing member 31 is prepared with a hard material such as aluminum and hard resin, is shaped substantially into a plate, and is adhered to the back surface of the solar panel 20. A notch is provided in the center of the back surface of each of the long frames 1 and 1 for the reinforcing frame 3 to be engaged with. The reinforcing frame 3 has two end portions put into these notches from the back surface side and is engaged with the long frames 1 and 1. A terminal box 20a and a cable 20b extending from the terminal box 20a are provided on the back surface of the solar panel 20.

As illustrated in FIG. 3, the reinforcing frame 3 is arranged across the opposing long frames 1 and 1 of the rectangular frame 10 and is attached to the rectangular frame 10. The reinforcing frame 3 is arranged at such a position that the shock absorbing member 31 is sandwiched between the reinforcing frame 3 and the solar panel 20. Thus, because the shock absorbing member 31 is positioned between the solar panel 20 and the reinforcing frame 3 and because the shock absorbing member 31 is adhered to the back surface of the solar panel 20, it would not move or become detached.

Figure 4:
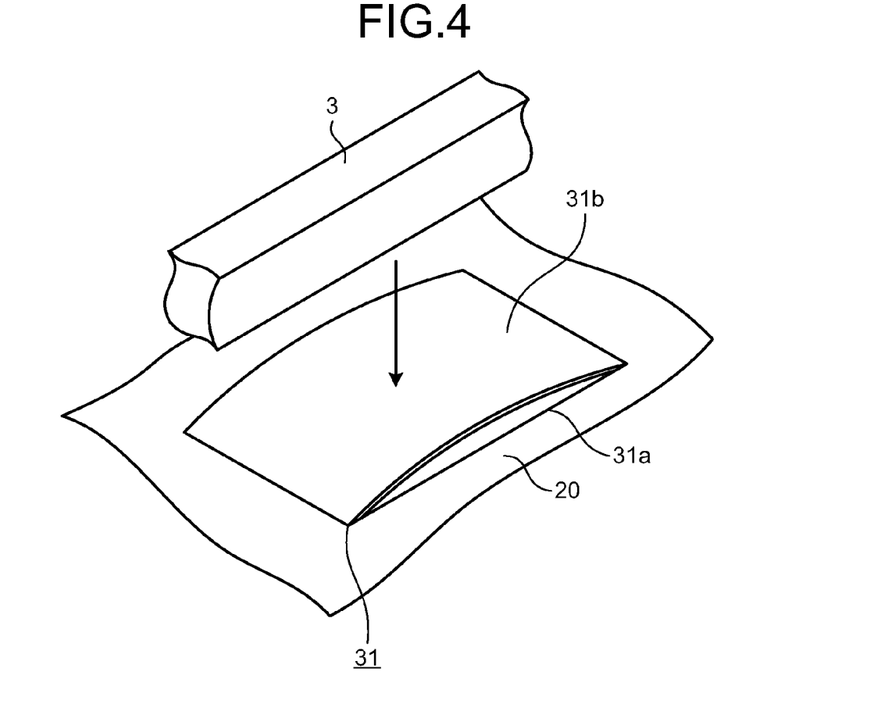
FIG. 4 is a perspective view of a shock absorbing member according to the first embodiment that is sandwiched and arranged between the solar panel and the reinforcing frame in the solar cell module of the present invention.
Figure 5:
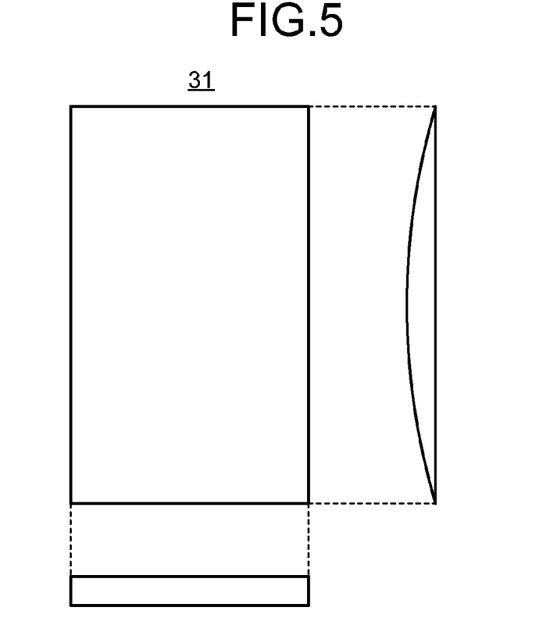
FIG. 5 is a diagram of the shock absorbing member according to the first embodiment viewed from three directions.

FIG. 4 is a perspective view of the shock absorbing member according to the first embodiment sandwiched between the solar panel and the reinforcing frame in the solar cell module of the present invention. FIG. 5 is a diagram of the shock absorbing member according to the first embodiment viewed from three different directions. As shown in FIGS. 4 and 5, the first main surface facing the solar panel 20 is a flat surface 31a that is substantially flat so that it can be flatly attached to the solar panel 20. On the other hand, the second main surface facing the reinforcing frame 3 is an arc-in-section curved surface 31b. The arc-in-section curved surface 31b is a curved surface that is curved in the longitudinal direction of the reinforcing frame 3, is convexed toward the reinforcing frame 3, and is shaped into an arc in cross section. In other words, the arc-in-section curved surface 31b is a bent surface that is formed of a portion of a cylinder having a center axis orthogonal to the reinforcing frame 3. Then, the arc-in-section curved surface 31b is curved up to positions connecting to the flat surface 31a. In other words, the shock absorbing member 31 according to the present embodiment does not have any end surfaces in the longitudinal direction of the reinforcing frame 3.

Figure 6:
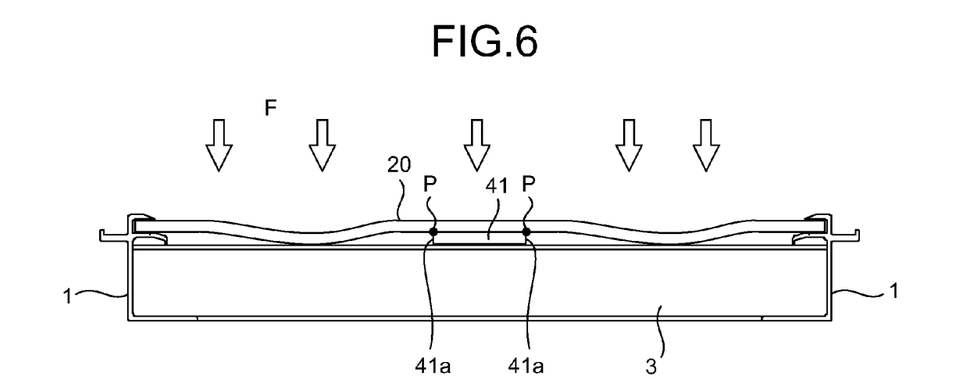
FIG. 6 is an explanatory diagram that corresponds to the cross section of FIG. 3 along line A-A, where the action points of the snow load coincide with the action points of the reaction force of the reinforcing frame in the structure incorporating a conventional shock absorbing member.

FIG. 6 is an explanatory diagram that corresponds to a cross section of the structure incorporating a conventional shock absorbing member of FIG. 3 along line A-A, where the acting point of the snow load and the acting point of the reaction force of the reinforcing frame coincide with each other. In FIG. 6, in the conventional solar cell module, a shock absorbing member 41 of a simple rectangular solid is arranged between the solar panel 20 and the reinforcing frame 3.

If, for example, snow accumulates entirely on the solar panel 20, and a snow load F of the snow acts onto the solar panel 20, the entire solar panel 20 would bow. Here, because the four sides of the circumference of the solar panel 20 is supported by the rectangular frame 10 and its center is supported by the shock absorbing member 41, these positions would not be moved, and therefore the remaining portion sags and is deformed. For this reason, if the shock absorbing member 41 is a simple rectangular solid, the local stress is concentrated around the end surfaces and the like of the shock absorbing member 41. More specifically, the local stress is concentrated on a side contacted the solar panel 20 in the longitudinal end surface 41a of the shock absorbing member 41 (to be still more specific, the center of this side). Thus, the solar panel 20, especially the layer made of glass, tends to break at local stress concentrated points P.

Figure 7:
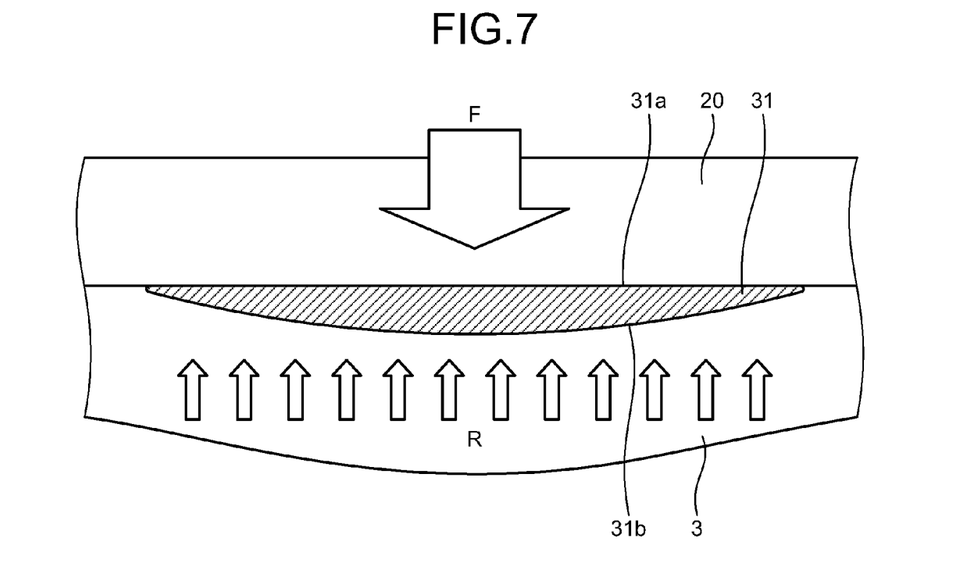
FIG. 7 is a schematic diagram of the shock absorbing member according to the first embodiment, where it scatters the reaction force from the reinforcing frame side.

FIG. 7 is a schematic diagram of the shock absorbing member 31 according to the present embodiment scattering the reaction force of the reinforcing frame 3 side. In FIG. 7, in the shock absorbing member 31 according to the present embodiment, the first main surface on the side of the solar panel 20 is the flat surface 31a, and the second main surface on the side of the reinforcing frame 3 is the arc-in-section curved surface 31b so that the reaction force from the reinforcing frame 3 against the snow load F is scattered along the arc-in-section curved surface 31b and thus would not concentrate on a single point.

As discussed above, the solar cell module according to the present embodiment mitigates the concentration of the local stress created between the solar panel 20 and the shock absorbing member 31. Then, the solar panel 20, especially the layer made of glass, can be prevented from breaking, which improves the load bearing property of the module that tends to be degraded.

The first main surface of the shock absorbing member 31 may be approximately a flat surface 31a and be brought into contact flatly with a large area of the solar panel 20. Moreover, the second main surface of the shock absorbing member 31 according to the present embodiment is an arc-in-section curved surface 31b as discussed above, but it is not limited to a circular arc. Similar effects can be achieved with a curved surface that forms a smooth arc shape. Further, the arc-in-section curved surface 31b may be a curved surface that forms approximately an arc shape in cross section, and similar effects can be achieved with the curved surface, for example, that partly contains flat surfaces smoothly continuing in the middle of the curved surface.

Embodiment 2

Figure 8:
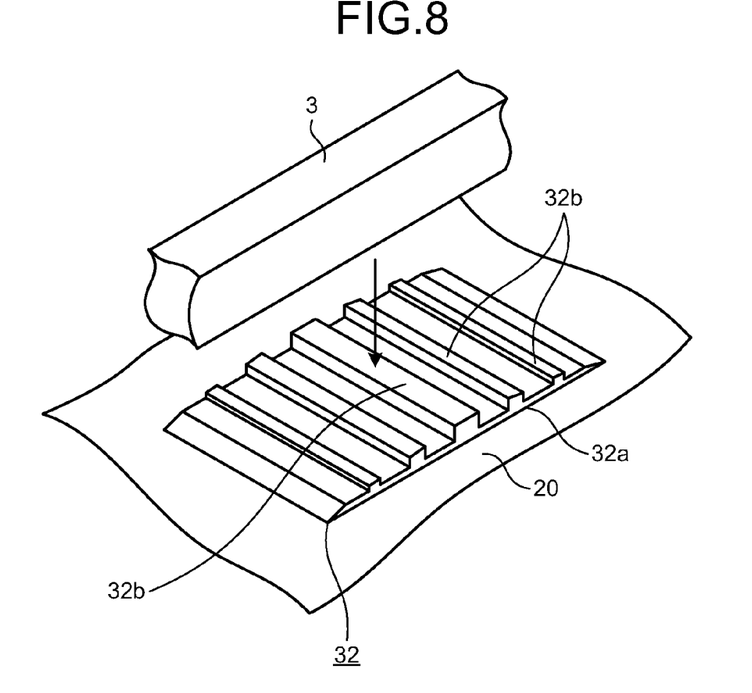
FIG. 8 is a perspective view of the shock absorbing member according to the second embodiment sandwiched and arranged between the solar panel and the reinforcing frame in the solar cell module of the present invention.
Figure 9:
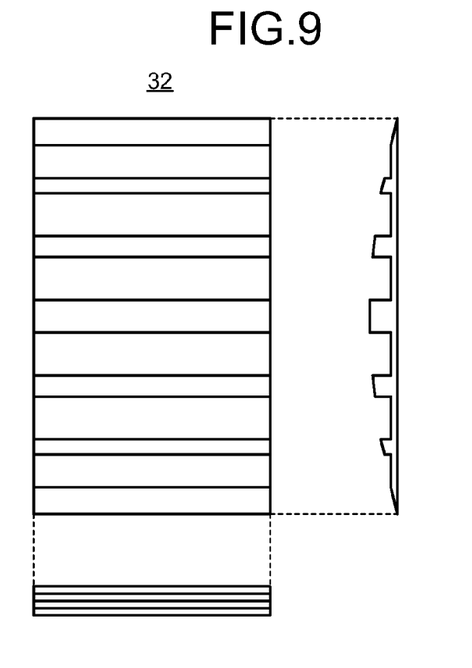
FIG. 9 is a diagram of the shock absorbing member according to the second embodiment viewed from three different directions.

FIG. 8 is a perspective view of a shock absorbing member according to the second embodiment arranged and sandwiched between the solar panel and the reinforcing frame in the solar cell module of the present invention. FIG. 9 is a diagram of the shock absorbing member according to the second embodiment viewed from three different directions. As illustrated in FIGS. 8 and 9, in a shock absorbing member 32 according to the present embodiment, the first main surface that faces the solar panel 20 is a flat surface 32a that is substantially flat so that it can be brought into contact flatly with the solar panel 20.

On the other hand, multiple projections 32b are formed on the second main surface facing the reinforcing frame 3 in such a manner to extend in a direction orthogonal to the reinforcing frame 3, and the curved surface smoothly connecting the ridge line (top surface) of these projections 32b forms the curved surface 32b showing an arc in cross section and convexed on the side of the reinforcing frame 3. The intervals of the projections 32b are suitably designed so that the solar panel 20 would not sag into the gaps and become deformed. Then, the projection 32b arranged at the very end is designed to be substantially triangular in cross section and its top surface continues to the flat surface 31a. In other words, the shock absorbing member 32 according to the present embodiment does not have any end surface in the longitudinal direction of the reinforcing frame 3. The rest of the structure is the same as that of the first embodiment.

Figure 10:
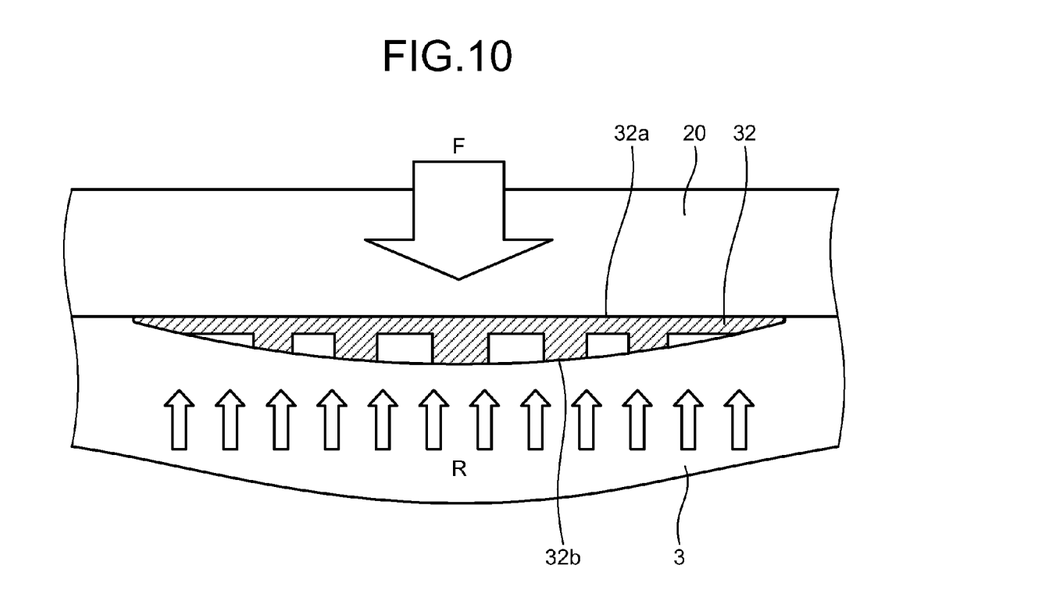
FIG. 10 is a schematic diagram of the reaction force from the reinforcing frame side distributed by the shock absorbing member according to the second embodiment.

FIG. 10 is a schematic diagram of the shock absorbing member 32 according to the second embodiment scattering the reaction force of the reinforcing frame 3. The reinforcing frame 3 is in contact with the ridge line (top surface) of the projections 32b of the shock absorbing member 32 and bows in the longitudinal direction of the reinforcing frame 3, forms a curved surface having an arc in cross section and concaved toward the solar panel 20. For this reason, the reaction force R from the reinforcing frame 3 side is scattered along this curved surface having an arc in cross section. Thus, effects substantially similar to that of the first embodiment can be attained. Furthermore, the amount of material required for the shock absorbing member 32 according to the present embodiment is reduced for the gaps that are created, and thus the cost can be reduced.

The curved surface formed by the shock absorbing medium 32 is not limited to the curved surface having an arc in cross section, but may be a curved surface that shows a smooth arc, and then substantially the same effects can be achieved.

Embodiment 3

Figure 11:
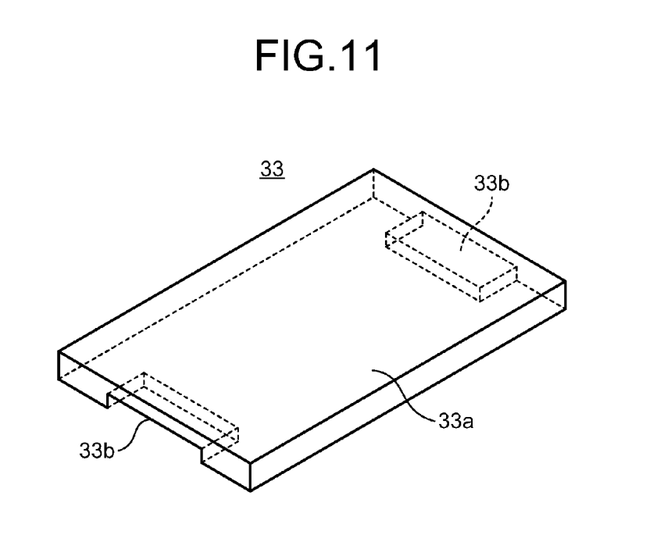
FIG. 11 is a perspective view of the shock absorbing member according to the third embodiment in the solar cell module of the present invention.
Figure 12:
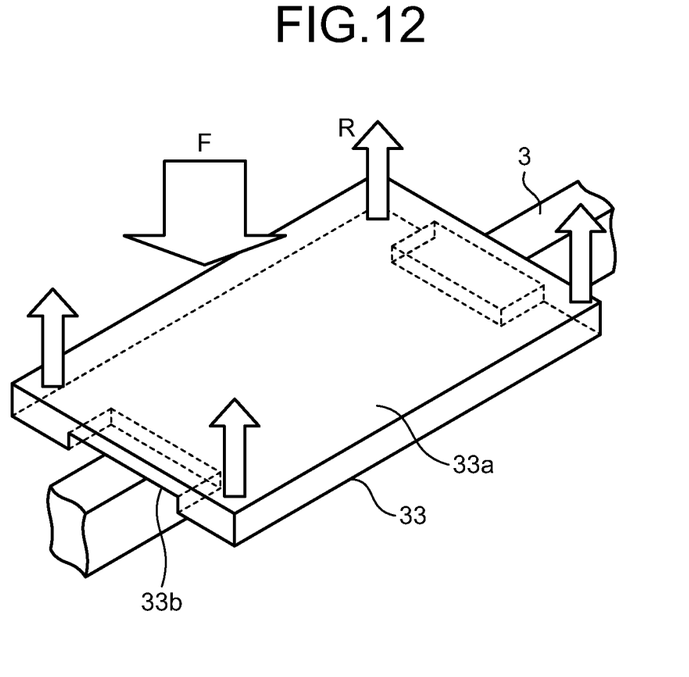
FIG. 12 is a schematic diagram of the reaction force of the reinforcing frame distributed by the shock absorbing member according to the third embodiment.

FIG. 11 is a perspective view of the shock absorbing member according to the third embodiment in the solar cell module of the present invention. FIG. 12 is a schematic view of the shock absorbing member according to the present embodiment scattering the reaction force from the reinforcing frame side. A shock absorbing member 33 according to the present embodiment is a plate of a substantially rectangular solid, whose first main surface facing the solar panel 20 is a flat surface 33a. Further, a notch 33b is created in the second main surface facing the reinforcing frame 3, in the center portion of each end thereof in the longitudinal direction of the reinforcing frame 3. In other words, the notches 33b are arranged in the center of the sides of the end surfaces in the longitudinal direction of the reinforcing frame 3 on the reinforcing frame 3 side. That is, the notches 33b are provided in the center portions of the sides facing the sides of the solar panel 20 side on which local stress concentrated points P (FIG. 6) appear in the end surfaces in the longitudinal direction of the reinforcing frame 3 in a conventional structure.

In the shock absorbing member 33 having such a structure, the notches 33b are arranged in the center of the sides facing the sides on which a local stress concentrated points P appear in the conventional structure. In other words, no shock absorbing member is provided in these portions. Thus, when stress is received, the end portions where there used to be a local stress concentrated points P can escape slightly toward the notches 33b side. For this reason, the reaction force from the reinforcing frame 3 side that concentrates on the local stress concentrated points can scatter in the short-side direction of the end portion direction, as illustrated in FIG. 12. Hence, the solar panel 20 can be prevented from breaking.

The notches 33b produce effects as long as they are positioned at least in the center of the sides of the reinforcing frame 3 side among respective four sides forming the end surfaces (two side surface) of the shock absorbing medium 33 intersecting with the longitudinal direction of the reinforcing frame 3, and the notches 33b arranged across the entire length of the sides of the solar panel 20 side in the end surface may produce approximately the same effects. However, in case where the notches 33b are provided on the sides of the solar panel 20 side in the end surface, too large notches 33b reduces the contact area of the shock absorbing member 33 and the solar panel 20, which would produce only effects that can be obtained with a small shock absorbing member.

Embodiment 4

Figure 13:
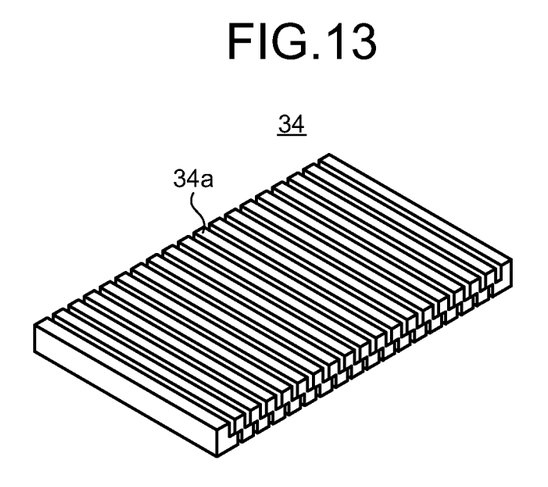
FIG. 13 is a perspective view of the shock absorbing member according to the fourth embodiment in the solar cell module of the present invention.
Figure 14:
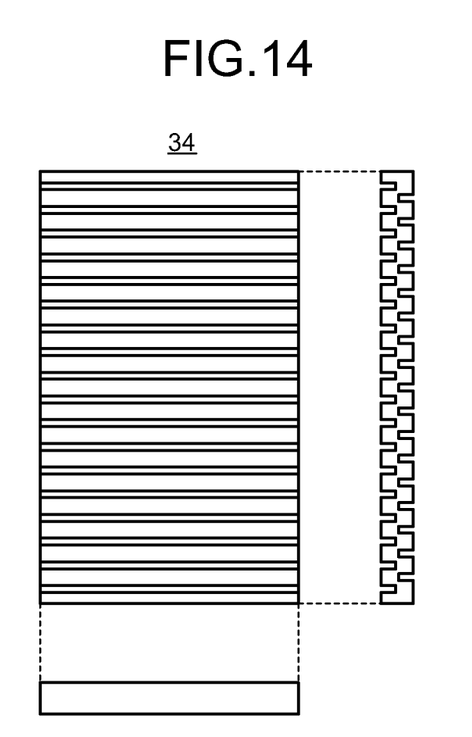
FIG. 14 is a diagram of the shock absorbing member according to the fourth embodiment viewed from three different directions.

FIG. 13 is a perspective view of the shock absorbing member according to the fourth embodiment in the solar cell module of the present invention. FIG. 14 is a diagram of the shock absorbing member according to the present embodiment viewed from three different directions. A shock absorbing member 34 according to the present embodiment is in the form of bellows as a whole. In the shock absorbing member 34 according to the present embodiment, corrugations 34a are formed on the entire two main surfaces, the first main surface facing the solar panel 20 and the second main facing the surface reinforcing frame 3, to extend in the transverse direction of the reinforcing frame 3 in such a manner as to expand and contact in the longitudinal direction of the reinforcing frame 3 and have resilience in the thickness direction.

When pressure is applied from the side of the solar panel 20 side or the reinforcing frame 3 side, the shock absorbing member 34 having the above structure expands in the longitudinal direction of the reinforcing frame 3 in accordance with the level of the pressure. At the same time, it shrinks in the thickness direction. In this manner, the solar panel 20 gently bows and mitigates the stress concentration between itself and the reinforcing frame 3 so that the breakage of the solar panel 20 can be reduced.

The shock absorbing members 31 to 34 according to the first to fourth embodiments are singly provided between the solar panel 20 and the reinforcing frame 3, but the shock absorbing members 31 to 34 may be multiply provided in the longitudinal direction of the reinforcing frame 3. For example, multiple shock absorbing members 31 to 34 may be arranged at predetermined intervals in the length direction of the reinforcing frame 3. In this manner, the warping of the solar panel 20 can be reduced, and the solar panel 20 can be prevented from touching the reinforcing frame 3, and therefore the breakage of the solar panel 20 can be more reliably avoided.

INDUSTRIAL APPLICABILITY

As discussed above, the solar cell module of the present invention is effective for a solar cell module installed in an architectural structure such as a house and a building, and is suitable especially for a solar cell module that is to be installed in a region with heavy snowfall or severe weather.

REFERENCE SIGNS LIST

1 LONG FRAMES
2 SHORT FRAMES
3 REINFORCING FRAME
10 RECTANGULAR FRAME
15 SOLAR CELL
20 SOLAR PANEL
20a TERMINAL BOX
20b CABLE
31 to 34 SHOCK ABSORBING MEMBER
31a, 32a, 33a FLAT SURFACE
31b ARC-IN-SECTION CURVED SURFACE
32b PROJECTIONS
33b NOTCHES
34a CORRUGATIONS
41 CONVENTIONAL SHOCK ABSORBING MEMBER
41a END SURFACE
P LOCAL STRESS CONCENTRATED POINT

The invention claimed is:

1. A solar cell module, comprising:
a solar panel that includes a transparent substrate and is configured by aligning solar cells;
a rectangular frame surrounding an entire perimeter of an edge of the solar panel, and the rectangular frame includes a pair of opposing long frames and a pair of opposing short frames, and a notch is provided in a center, in a longitudinal direction, of a back surface of each of the long frames;
a reinforcing frame engaged with the notch of each of the long frames and arranged across a back surface of the solar panel; and
a shock absorbing unit arranged between the solar panel and the reinforcing frame,
wherein the shock absorbing unit has a first main surface facing the solar panel, and the first main surface is a flat surface, and
a second main surface facing the reinforcing frame, the second main surface including a plurality of projections extending in a direction orthogonal to a longitudinal direction of the reinforcing frame, in which a curved line smoothly connecting ridge lines of the projections to one another defines a line having only a single curve between terminal ends of the second main surface in a longitudinal direction of the reinforcing frame, and is an arc-in-section curved surface line convexed facing the reinforcing frame, wherein
the projections arranged at the terminal ends are configured to be triangular in cross section and a top surface thereof continues to the flat surface such that the shock absorbing unit has no end surfaces in the longitudinal direction of the reinforcing frame.

2. The solar cell module according to claim 1, wherein the shock absorbing unit is adhered to the back surface of the solar cell panel.

3. The solar cell module according to claim 1, wherein a plurality of shock absorbing units are arranged in the longitudinal direction of the reinforcing frame.

* * * * *